Jan. 12, 1926.  
G. B. MAGOON  
1,568,985  
CUTTER HEAD FOR MOLDING MACHINES  
Original Filed June 27, 1922

Inventor:
George B. Magoon
by attorneys
Southgate Hay & Hawley

Witness
C. F. Wesson

Patented Jan. 12, 1926.

1,568,985

UNITED STATES PATENT OFFICE.

GEORGE B. MAGOON, OF WORCESTER, MASSACHUSETTS.

CUTTER HEAD FOR MOLDING MACHINES.

Original application filed June 27, 1922, Serial No. 571,161. Divided and this application filed March 28, 1925. Serial No. 19,136.

*To all whom it may concern:*

Be it known that I, GEORGE B. MAGOON, a citizen of the United States, residing at Worcester, in the county of Worcester and State of Massachusetts, have invented a new and useful Cutter Head for Molding Machines, of which the following is a specification.

This invention relates to a cutter head particularly designed for use in molding articles of wood, such as shoe lasts. This application is a division of my prior application, Serial No. 571,161, filed June 27, 1922, upon a last lathe.

It is the object of my present invention to provide a cutter head for molding machines and other similar purposes which may be economically constructed and easily assembled and which will be free from the danger of loosening parts while in operation.

With this general object in view, one feature of my present invention relates to the provision of a cutter head in which each cutting blade is firmly and separately secured to each of its two adjacent cutting blades.

My invention further relates to particular arrangements and combinations of parts which will be hereinafter described and more particularly pointed out in the appended claims.

A preferred form of the invention is shown in the drawings, in which

Figure 1:
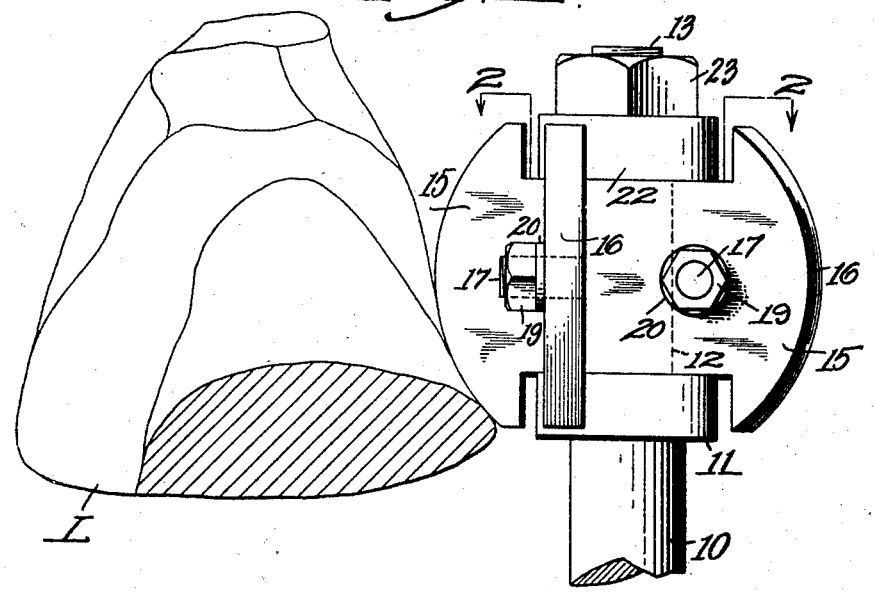
Fig. 1 is a side elevation of my improved cutter head.
Figures 2, 3:
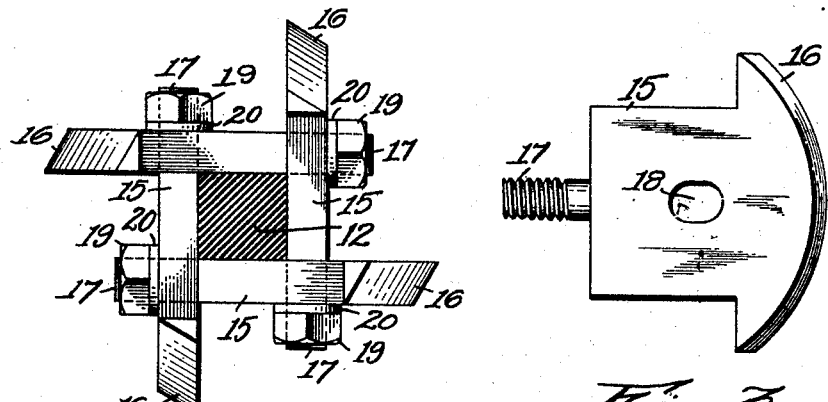
Fig. 2 is a sectional plan view, taken along the line 2—2 in Fig. 1.
Fig. 3 is a side elevation of one of the cutter blades.

I have shown my improved cutter head as assembled upon a supporting member or shaft 10, preferably having a flange or collar 11 integral therewith or firmly secured thereto. Above the flange 11, the shaft 10 is provided with a plurality of flat faces and is preferably made square or rectangular in cross section, as indicated at 12 in Fig. 2. The extreme outer end of the shaft is threaded, as shown at 13 (Fig. 1).

A plurality of cutting blades 15 are assembled about the square portion 12 of the shaft 10. Each blade 15 comprises a cutting portion 16 at one end of the blade and a threaded projection 17 at the opposite end and each blade is also provided with a somewhat elongated opening 18 in the body portion of the blade.

The cutting portion 16 may be of any desired outline and is indicated in the drawing as being segmental to provide a ball-shaped cutter head. Nuts 19 and washers 20 (Fig. 2) are provided for the threaded projections 17.

The cutters are assembled about the shaft portion 12 by inserting each threaded projection 17 into the opening 18 of an adjacent blade 15 and by applying the nuts 19 and washers 20 thereto. By tightening the nuts 19, the cutters 15 are clamped firmly about the shaft portion 12 and each blade is firmly secured to its two adjacent blades.

A collar 22 (Fig. 1) may be forced against the cutter blades 15 by a clamping nut 23, thus binding the blades against the flange portion 11 of the shaft and forming an additional securing means for the blades.

A cutter head thus constructed is symmetrical, and perfectly balanced, and all parts of the head are very firmly secured together, a very essential feature in high speed woodworking cutters.

The ball-shaped cutter shown in the drawings is particularly well adapted for molding or shaping a shoe last, as indicated at L in Fig. 1.

Having thus described my invention and the advantages thereof, I do not wish to be limited to the details herein disclosed otherwise than as set forth in the claims, but what I claim is:—

1. A molding cutter head comprising a supporting member having a plurality of flat faces, and a plurality of cutting blades secured in assembled relation about said member, each blade being firmly and separately secured to each of its two adjacent cutting blades.

2. A molding cutter head comprising a supporting member having a plurality of flat faces, and a plurality of cutting blades secured in assembled relation about said member, each blade being firmly and separately secured to each of its two adjacent cutting blades, and said member having a flange thereon and having means for forcing said blades against said flange.

3. A molding cutter head comprising a supporting member having a plurality of flat faces, a plurality of duplicate blades, each having a segmental cutting portion, an opening, and a portion adapted to extend through the opening in an adjacent blade, and means to secure said blades in assembled relation about said member.

4. A molding cutter head comprising a supporting member having a plurality of flat faces, a plurality of duplicate blades, each having a cutting portion, an opening, and a threaded projection adapted to extend through the opening in an adjacent blade, and clamping nuts to secure said blades in assembled relation about said member.

5. A molding cutter head comprising a supporting member having a plurality of flat faces, a plurality of duplicate blades, and means to clamp said blades about said support, each blade having an opening, and a projecting portion extending through the opening in an adjacent blade, and means being provided to secure said blades in assembled relation about said supporting member.

6. A molding cutter head comprising a supporting member having a portion of rectangular cross section, and a plurality of cutting blades clamped thereto, each blade having a cutting edge and a rearward threaded projection, and each blade having an opening between its edge and its rearward projection through which the projection of an associated blade extends, and clamping nuts on said projections.

7. A ball-shaped molding cutter head comprising a supporting member of square cross-section, a plurality of blades having arc-shaped cutting edges, each blade having an opening and a rearward threaded projection, the projection on each blade extending through the opening in an adjacent blade, and clamping nuts on said projections, effective to secure said blades in assembled relation on said member.

In testimony whereof I have hereunto affixed my signature.

GEORGE B. MAGOON.